United States Patent [19]

Sasaki et al.

[11] Patent Number: 4,824,396

[45] Date of Patent: Apr. 25, 1989

[54] ELECTRICAL CONNECTION APPARATUS

[75] Inventors: Kunihiko Sasaki; Kiichi Yamaguchi; Tsumoru Oka; Takasi Ohya; Mituaki Shinraku; Akihiro Konno; Yuichi Ida, all of Miyagi, Japan

[73] Assignee: Alps Electric Co., Ltd., Japan

[21] Appl. No.: 170,918

[22] Filed: Mar. 17, 1988

[30] Foreign Application Priority Data

May 27, 1987 [JP] Japan .............................. 62-78734[U]
Jul. 7, 1987 [JP] Japan ............................ 62-103307[U]

[51] Int. Cl.4 ............................................. H01R 39/02
[52] U.S. Cl. ...................................... 439/475; 439/15; 439/164
[58] Field of Search .................... 439/13, 15, 164, 474, 439/475

[56] References Cited

U.S. PATENT DOCUMENTS

| 4,422,699 | 12/1983 | Sakurai et al. | 439/15 |
| 4,502,746 | 3/1985 | Wawra et al. | 439/15 |
| 4,722,690 | 2/1988 | Priede | 439/15 |

FOREIGN PATENT DOCUMENTS 3041258 6/1982 Fed. Rep. of Germany ........ 439/15

Primary Examiner—Eugene F. Desmond
Attorney, Agent, or Firm—Guy W. Shoup; Paul J. Winters

[57] ABSTRACT

An electrical connection apparatus includes a flat cable having one end secured to a fixed member and the other end secured to a movable member. The flat cable is provided with a turning portion at its fixing portion to the fixed member, and a cutter is inserted toward a folding line of the turning portion to cut the flat cable.

8 Claims, 7 Drawing Sheets

ELECTRICAL CONNECTION APPARATUS

FIELD OF THE INVENTION

This invention relates to an electrical connection apparatus including a flat cable for electrical connection between a fixed member and a movable member.

BACKGROUND OF THE INVENTION

An electrical connection apparatus uses a flat cable for electrically connecting a fixed member and a movable member. The flat cable has one end secured to the fixed member and the other end secured to the movable member. When the movable member rotates, the flat cable is reeled on or supplied from the movable member to permit a desired rotation of the movable member. Such an electrical connection apparatus is used in a car steering, for example. The movable member, once mounted in a car steering, must be rotatable substantially equally in opposite directions from a neutral position thereof. If the movable member is originally rotated in either direction, a great difference is produced between rotatable amounts in opposite directions. That is, a driver can rotate the steering much in one direction but cannot rotate it sufficiently in the other direction. This is very dangerous in driving the car.

In order to avoid this, a known prior art system includes a positioning mechanism which serves as a relative positioning index between a fixed member and a movable member to ensure a correct mounting of the electrical connection apparatus type in various devices.

However, regardless of the use of such a relative positioning mechanism between fixed and movable members, there still remains a problem of an incorrect mounting of the electrical connection apparatus itself. If the incorrect mounting is such that the rotatable amount of the movable member in the supply direction of the flat cable is smaller than a correct amount, its rotation itself in this direction is possible beyond a limit amount although the flat cable may be bent or twisted or an increased resistance against the rotating force may be fed back to the driver. However, if the incorrect mounting is such that the rotatable amount of the movable member in the reel-on direction of the flat cable is smaller than a correct amount, the movable member, when rotated in this direction, is locked at a position and cannot rotate further. Therefore, when the apparatus is used as a steering of a car, the incorrect mounting of the movable member makes it impossible for a driver to rotate the steering handle in this direction. This is very dangerous and sometimes invites an accident resulting in injury or death.

OBJECT OF THE INVENTION

It is therefore an object of the invention to provide an extra-safety electrical connection apparatus capable of forcibly rotating the movable member under a predetermined force also when original relative positions between the fixed member and the movable member are not correct.

SUMMARY OF THE INVENTION

In order to achieve the object, the invention provides an electrical connection apparatus characterized in that the flat cable has a turning portion at a securing position thereof with respect to the fixed member. A cutter is inserted toward a turning line in the turning portion so that when the movable member is rotated beyond a predetermined amount, the flat cable is cut by the cutter.

Under this construction, when the movable member is originally offset in the flat cable takeup direction with respect to the fixed member, that flat cable is reeled upon a rotation of the movable member in this direction, and a tension force acts on the turning portion at the junction to the fixed member, so as to urge the turning line of the flat cable against the cutter. When a tension force beyond a predetermined value is applied, the flat cable is cut by the cutter. Therefore, regardless of a mounting error, the movable member itself can rotate. When the movable member is mounted correctly, the flat cable does not receive such a large tension force to cut it upon a rotation of the movable member, and it is not destroyed by the cutter.

BRIEF DESCRIPTION OT THE DRAWINGS

FIGS. 1 through 5 illustrate a first embodiment of the invention in which.

FIGS. 6 through 9 illustrate a second embodiment of the invention in which:

DETAILED DESCRIPTION

The invention is described below in detail, referring to preferred embodiments illustrated in the drawings.

Figure 1:
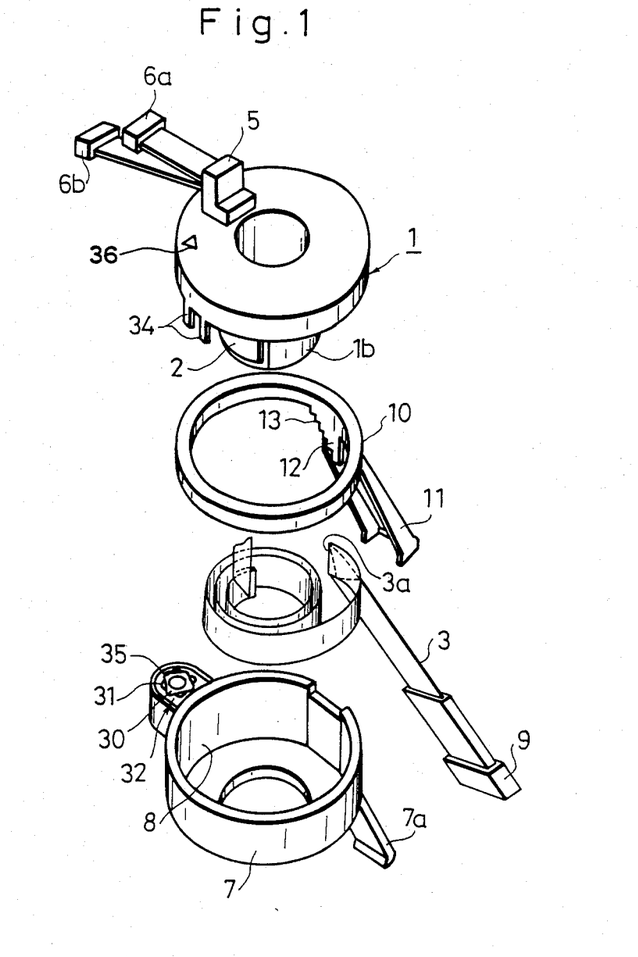
FIG. 1 is an exploded perspective view of an electrical connection apparatus.

In FIG. 1, a movable member 1 has an upper large-diameter portion 1a from which a small-diameter extension 1b extends vertically downwardly. The large-diameter portion 1a is provided with a wall 2 which extends continuously therefrom and is opposed to and spaced from the outer surface of the small-diameter extension 1. Between the wall 2 and the small-diameter extension is secured one end of a flexible flat cable 3 in which multiple conductive foils are embedded. The large-diameter portion 1a has a through hole 4 and a cable exit 5. The flat cable 3 extends to the exterior of the movable member 1 via the through hole 4 and the cable exit 5, and its end is bifurcated and provided with connectors 6a and 6b for connection to various electrical parts.

The movable member 1 is mounted together with a cylindrical fixed member 7 in a fashion that the small-diameter extension 1b is accepted in a central space of the fixed member 7 so as to define a cable chamber 8 between the inner surface of the fixed member 7 and the outer surface of the small-diameter extension 1b to accept the flat cable 3 therein. An outlet guide 7a extends outwardly from the fixed member 7 to guide the flat cable 3. The other end of the flat cable 3 extends to the exterior via the outlet guide 7a, and its distal end is provided with a connector 9 for connection to a power source, controller, etc.

In order to secure the flat cable 3 to the fixed member 7, an intermediate ring 10 in the form of a ring-shaped member is interposed between the fixed member 7 and the movable member 1. The intermediate ring 10 has a guide wall 11 extending continuously therefrom for engaging the outlet guide 7a of the fixed member 10 to define a path of the flat cable 3. The flat cable 3 contained in the cable chamber 8 is wound along the inner surface of the fixed member 7. The extending direction of the flat cable 3 is changed by a right angle at a turning portion 3a formed at a position of the flat cable 3 aligned with the outlet guide 7a of the fixed member 7, and is guided to the path between the outlet guide 7a and the guide wall 11.

In order to hold the turning portion 3a of the flat cable 3 there, the intermediate ring 10 is provided with a press plate 12 continuously extending therefrom face to face with the guide wall 11. When the intermediate ring 10 is mounted on the fixed member 7, the press plate 12 is positioned inside the fixed member 7 and inserted in the turning portion 3a of the flat cable 3 so that the turning portion 3a is sandwichingly fixed between the press plate 12 and the inner surface of the fixed member 7.

Figure 2:
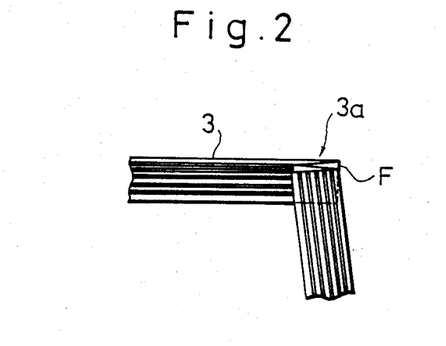
FIG. 2 is a fragmentary view showing a turning portion of a flat cable.
Figure 3:
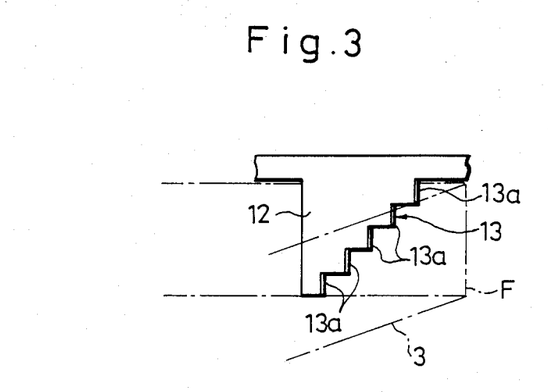
FIG. 3 is a front elevation of a cutter.

As shown in FIG. 2, the turning portion 3a of the flat cable 3 consists of multiple dead folds and exhibits a predetermined thickness there. Since the press plate 7 urges the thick portion of the flat cable 3 against the fixed member 7, a more reliable fixture of the turning portion 3a is expected. In addition to the dead folds, the flat cable 3 is further folded along a folding line F. The press plate 12 is disposed to enter in the interior of the folding line F. At a portion opposed to the folding line F, the press plate 12 is in the form of a flight of stairs corresponding to positions of the conductive foils as shown in FIG. 3. The distal end of the press plate 12 define a cutter 13 having a blade 13a in the form of a knife edge.

Figure 4:
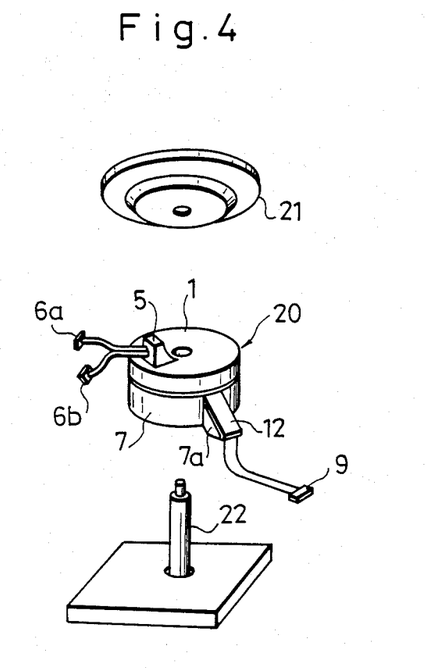
FIG. 4 is an exploded view showing how the electrical connection apparatus is mounted in a steering of a car.

An electrical connection apparatus 20 formed as described above is mounted in a steering assembly of a car, for example, by connecting it to a steering wheel 21 and a steering shaft 22 as shown in FIG. 4. In the assembled configuration, the movable member 1 must be rotatable by a substantially equal amount in opposite directions from a neutral position. In order to ensure a correct mounting of the movable member 1 relative to the fixed member 7, an extension 7a of the fixed member 7 is provided with a pivotable member 32 which is supported pivotably by a shaft. The pivotable member 32 includes first and second gears 30 and 31 each having four teeth at 90 degrees interval and confronting with each other so that the teeth of both gears are aligned at 45 degrees interval. On the other hand, the movable member 1 is provided with a pair of engaging members 34 and 34 vertically extending therefrom to engage the first and seciond gears 30 and 31 respectively, so that when the movable member 1 effects one rotation, the engaging members 34 cause the pivotable member 32 to rotate by 90 degrees. The pivotable member 32 is provided with a mark 35 which serves a mark of the fixed member 7. The movable member 1 is also provided with a mark 36 on the upper surface thereof to cooperate with the mark 35 of the fixed member 7 to function as an index for a correct positioning between the movable member 1 and the fixed member 7.

The above-described embodiment operates as explained below.

The flat cable 3 is secured to the movable member 1 at one end thereof and to the fixed member 7 at the other end thereof. The flat cable 3 is loosely wound on the small-diameter extension 1b of the movable member 1 and received in the chamber 8 defined by the small-diameter extension 1b and the fixed member 7. Then the electrical connection apparatus 20 is completed. When the electrical connection apparatus 20 is mounted between the steering 21 and the steering shaft 22 of a car, it must be ensured that the movable member 1 is rotatable substantially equally in opposite directions. At a pivotal stroke end position of the movable member 1 in one direction, the flat cable 3 closely contacts the inner surface of the fixed member 7. At a pivotal stroke end position of the movable member 1 in the other direction, the flat cable 3 closely contacts the small-diameter extension 1b of the movable member 1. Therefore, at a neutral position of the movable member 1, it must be set at a substantial center position between the pivotal stroke ends. In this connection, when the mark 36 of the movable member 1 is aligned with the mark 35 of the pivotable member 32 in assembling the electrical connection aparatus 20, the neutral position is established. However, before the electrical connection apparatus 20 is incorporated in the steering or other device, the movable member 1 can rotate freely. Therefore, on assembling it, positioning of the movable member 1 and the fixed member 7 must be effected using the marks 35 and 36 as an index.

However, there often occurs a failure of positioning of the marks 35 and 36 during the aforegoing assembling. If the movable member 1 is offset in a direction for supplying the flat cable 3 from the small-diameter extension 1b, the movable member 1 can rotate in this direction beyond the pivotal stroke end although the flat cable 3 is bent or twisted or the resistance against the rotating force is increased. However, if the movable member 1 is offset in the other direction for winding the flat cable 3 on the small-diameter extension 1b, the movable member 1 cannot rotate beyond the pivotal stroke end.

Figure 5:
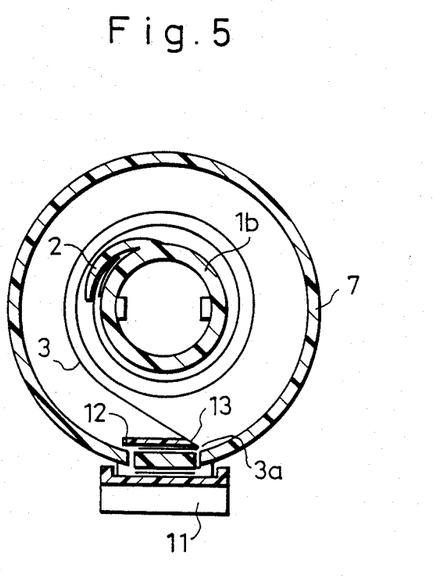
FIG. 5 is a view for explaining the operation of a cutter.
Figure 6:
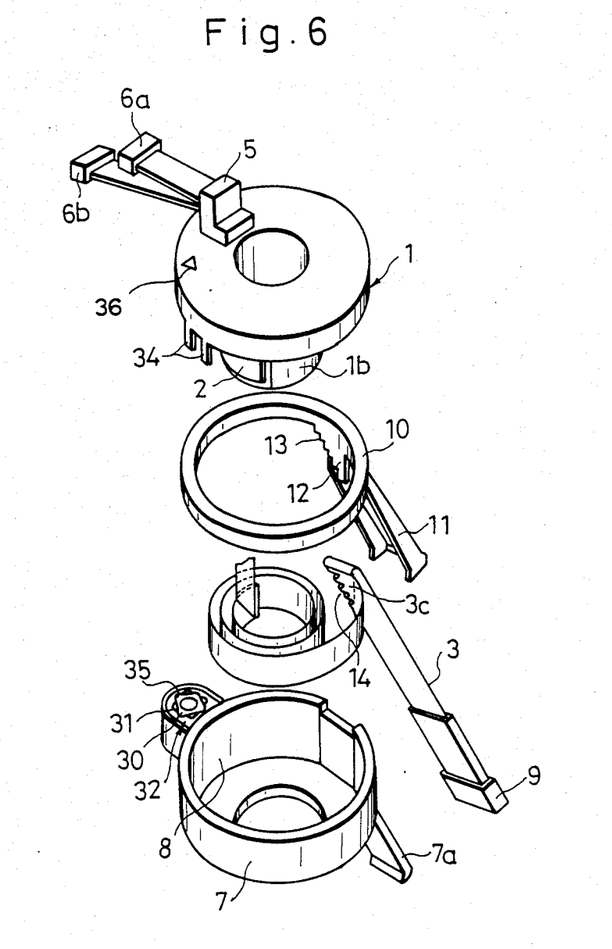
FIG. 6 is an exploded perspective view of an electrical connection apparatus.

As a countermeasure against this, the turning portion 3a is provided in the flat cable 3 at the junction to the fixed member 7, and the cutter 13 is provided in confrontation with the folding line F of the turning portion 3a. Therefore, when a large operation force is applied, the flat cable 3 is urged to the blade 13a of the cutter 13 as shown in FIG. 5 and subsequently cut for the safety in an emergency. Additionally, since the blade 13a of the cutter 13 has a form of a flight of stairs, it reduces the operation force during the cable cut, and prevents a sudden change in the load to alleviate the danger of an overrun of the movable member 1.

When the movable member 1 and the fixed member 7 take correct relative positions in the electrical connection apparatus 20, it never occurs that an operation force is applied in a direction for rotating the movable member 1 beyond the pivotal stroke end. Therefore, the flat cable 1 is nevery destroyed by the cutter 13.

Particularly, the use of the inventive apparatus in a car steering is greatly advantageous for the safety because if the steering cannot move sufficiently in either direction, this invites a traffic accident.

Figure 7:
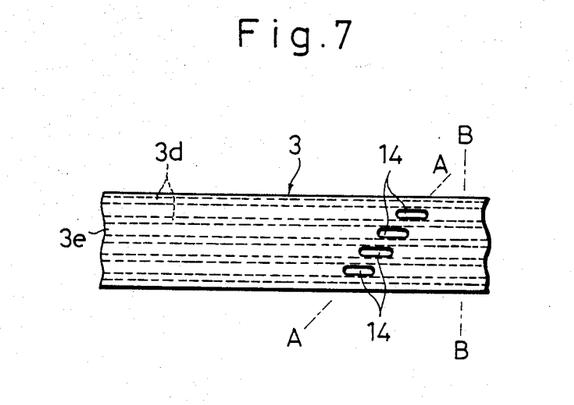
FIG. 7 is a fragmentary view of a flat cable.
Figure 8:
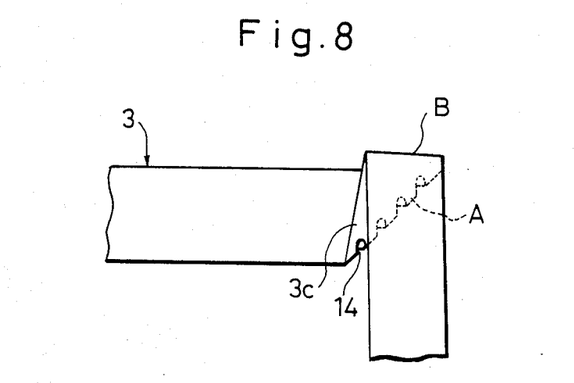
FIG. 8 is a fragmentary view showing a turning portion of the flat cable.
Figure 9:
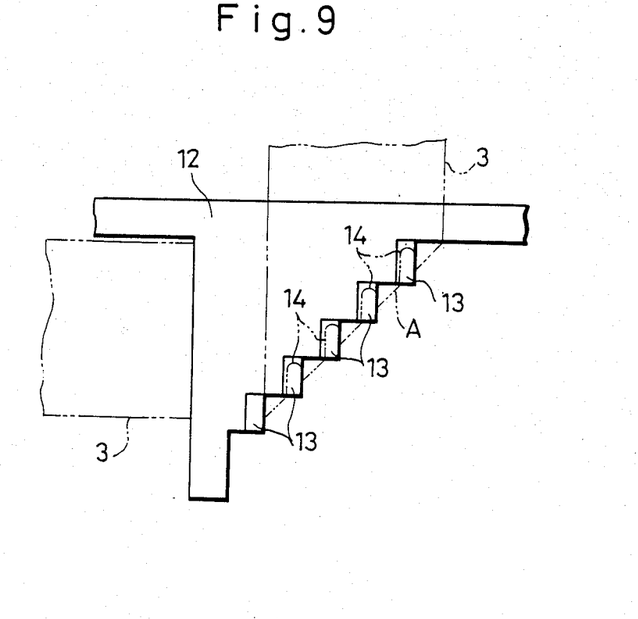
FIG. 9 is a front elevation of a cutter.

FIGS. 6 through 9 show a further embodiment of the invention. This embodiment has a general construction shown in FIG. 6 which is identical to the construction of the first embodiment except the arrangement of the turning portion of the flat cable 3. As shown in FIG. 7, the flat cable 3 in this embodiment consists of a base film 3e in which multiple conductors 3d are imbedded. The flat cable 3 has through holes 14 among the conductors 3d along a folding line A which is angled from the length direction of the flat cable 3. The flat cable 3 is folded along the folding line A and subsequently turned along a folding line B to form a turning portion 3a shown in FIG. 8. The press plate 12 is inserted in the interior of the folding line A. A portion of the press plate 12 opposed to the folding line A has a form of a flight of stairs as shown in FIG. 9, and its distal end defines a cutter 13 in the form of knife edges which engage the through holes 14 of the flat cable 3.

The above-described embodiments are explained as having the cutter 13 formed integrally with the press plate 12 at the side of the fixed member 7. However, the substantially same effect is obtained when a metal cutter is secured to the press plate 12. The embodiments may be modified by removing the base film at one side of the folding line of the flat cable 3 so as to further reduce the cutting force of the cutter 13 for cutting the flat cable 3.

As described above, the inventive electrical connection apparatus uses a turning portion formed in the flat cable at a fixing portion thereof to the fixed member and uses a cutter opposed to the folding line of the turning portion. Therefore, the movable member is never locked due to a mounting error between the movable member and the fixed member, and this improves the safety of electrical connection apparatuses.

What is claimed is:

1. In an electrical connection apparatus including a fixed member, a movable member pivotably mounted on the fixed member, and a flat cable having one end secured to the fixed member and the other end secured to the movable member to electrically connect them, an electrical connection apparatus characterized in that said flat cable is provided with a turning portion at a fixing portion thereof to said fixed member, and that a cutter is provided at a fixing portion of said fixed member to enter toward a folding line of said turning portion of said flat cable so that the cutter cuts said flat cable when said movable member is rotated beyond a predetermined amount.

2. An electrical connection apparatus according to claim 1 wherein said cutter has a configuration of a flight of stairs so as to sequentially, stepwisely cut said flat cable from one end margin to the other end margin thereof in accordance with the rotation of said movable member.

3. An electrical connection apparatus according to claim 1 wherein said cutter is integrally formed with said fixed member.

4. An electrical connection apparatus according to claim 1 wherein said cutter is made from metal and mounted on said fixed member.

5. In an electrical connection apparatus including a fixed member, a movable member pivotably mounted on the fixed member, and a flat cable imbedded with multiple conductors in a flexible film and having one end secured to the fixed member and the other end secured to the movable member to electrically connect them, an electrical connection apparatus characterized in that said flat cable is provided with a turning portion at a fixing portion thereof to said fixed member and provided with through holes among said conductors at said turning portion, and that a cutter is provided at a fixing portion of said fixed member to enter toward a folding line of said turning portion of said flat cable, so that when said cutter cuts said flat cable when said movable member is rotated beyond a predetermined amount.

6. An electrical connection apparatus according to claim 5 wherein said cutter has a configuration of a flight of stairs so as to sequentially, stepwisely cut said flat cable from one end margin to the other end margin thereof in accordance with the rotation of said movable member.

7. An electrical connection apparatus according to claim 5 wherein said cutter is integrally formed with said fixed member.

8. An electrical connection apparatus according to claim 5 wherein said cutter is made from metal and mounted on said fixed member.

* * * * *